(12) United States Patent
Yang et al.

(10) Patent No.: US 10,139,679 B2
(45) Date of Patent: Nov. 27, 2018

(54) LIQUID CRYSTAL DISPLAY PANEL AND METHOD OF MANUFACTURING THE SAME, AND DISPLAY DEVICE

(71) Applicant: BOE TECHNOLOGY GROUP CO., LTD., Beijing (CN)

(72) Inventors: Jiuxia Yang, Beijing (CN); Wenyan Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/227,521

(22) Filed: Aug. 3, 2016

(65) Prior Publication Data
US 2017/0242284 A1    Aug. 24, 2017

(30) Foreign Application Priority Data
Feb. 18, 2016    (CN) ............ 2016 1 0091322

(51) Int. Cl.
*G02F 1/1343*    (2006.01)
*G02F 1/1335*    (2006.01)

(52) U.S. Cl.
CPC ...... *G02F 1/13362* (2013.01); *G02F 1/13439* (2013.01); *G02F 1/133528* (2013.01);
(Continued)

(58) Field of Classification Search
CPC ............ G02F 1/1335; G02F 1/133528; G02F 1/1336; G02F 1/133617; G02F 1/133602; G02F 1/13362; G02F 1/1343; G02F 2202/36; G02F 2202/108; B82Y 20/00; B82Y 30/00; H01L 2251/5369; H01L 51/502; H01L 51/5203
See application file for complete search history.

(56) References Cited

U.S. PATENT DOCUMENTS 8,878,196 B2 * 11/2014 Choi ............... B82Y 20/00
                                                  257/79
2006/0222286 A1 * 10/2006 Spoonhower ...... G02B 6/12004
                                                  385/15
(Continued)

FOREIGN PATENT DOCUMENTS

CN    103427049 A    12/2013
CN    104749680 A    7/2015
CN    105093677 A    11/2015

OTHER PUBLICATIONS

First Chinese Office Action, for Chinese Patent Application No. 201610091322.0, dated Apr. 26, 2018, 10 pages.

*Primary Examiner* — Thoi Duong
(74) *Attorney, Agent, or Firm* — Kinney & Lange, P.A.

(57) ABSTRACT

Embodiments of the present invention relate to a liquid crystal display panel and a method of manufacturing the same, and a display device. The liquid crystal display panel includes: an array substrate and an opposite substrate, a polarized light source structure disposed on a side of the array substrate and capable of emitting linearly polarized light; and a polarization sheet disposed on the opposite substrate; wherein the polarized light source structure includes a first electrode layer, a second electrode layer and a quantum rod contained layer therebetween; the quantum rod contained layer may emit linearly polarized light a polarization direction parallel to an absorption axis of the polarization sheet.

11 Claims, 2 Drawing Sheets

(52) U.S. Cl.
CPC .. *G02F 1/133553* (2013.01); *G02F 1/133602* (2013.01); *G02F 1/134309* (2013.01); *G02F 2001/133614* (2013.01); *G02F 2202/108* (2013.01); *G02F 2202/36* (2013.01); *G02F 2203/05* (2013.01)

(56) References Cited

U.S. PATENT DOCUMENTS

| | | | |
|---|---|---|---|
| 2016/0223863 A1* | 8/2016 | Mizunuma | G02F 1/133617 |
| 2016/0223870 A1* | 8/2016 | Miki | G02F 1/133617 |
| 2017/0139111 A1* | 5/2017 | Komura | G02B 6/0056 |
| 2017/0146859 A1* | 5/2017 | Lin | G02F 1/133617 |
| 2017/0162133 A1* | 6/2017 | Sekiguchi | G02F 1/13362 |

* cited by examiner

LIQUID CRYSTAL DISPLAY PANEL AND METHOD OF MANUFACTURING THE SAME, AND DISPLAY DEVICE

CROSS-REFERENCE TO RELATED APPLICATIONS

This application claims priority of Chinese Patent Application No. 201610091322.0, filed Feb. 18, 2016, entitled "liquid crystal display panel and method of manufacturing the same, and display device", which is incorporated herein by reference in its entirety.

BACKGROUND OF THE INVENTION

Field of the Invention

The present invention generally relates to field of display panel, and particularly to a liquid crystal display panel and a method of manufacturing the same, and a display device.

Description of the Related Art

In a current liquid crystal display panel, a polarization sheet is often provided by an absorptive polarization sheet. When light emitted by a backlight source passes through this polarization sheet, a component of the light whose polarization direction is parallel to an absorption axis of the polarization sheet will be absorbed and thus will not pass the polarization sheet. Thus, in principle, transmittance of the polarization sheet for the light emitted by the backlight source is only up to 50%. That is, utilization rate of the light emitted by the backlight source is rather low and the energy is wasted. It is proposed in prior arts to configure a polarization sheet including a quantum rod contained layer to absorb a component of a non-polarization incident light using the quantum rods in the direction of its major/longitudinal axis of the quantum rods and to be excited to emit a polarization light at a wavelength larger than that of the incident light. Further, due to high internal quantum efficiency, an amount of the light that penetrates the polarization layer of the polarization sheet in this case is in principle increased with relative to a polarization sheet without adding the layer containing quantum rods therein, increasing light utilization rate of the backlight source. However, the proposed scheme requires providing the quantum rod contained layer, the polarization sheet and the backlight source, which renders a thickened display panel. Further, the transformation of the polarization light from the non-polarization light by the quantum rods is rather limited.

In summary, although the current scheme of provision of quantum rod contained layer in the polarization sheet to increase the amount of light penetrating the polarization layer in the polarization sheet may increase light utilization rate of the backlight source to some extent, it still requires providing the quantum rod contained layer, the polarization sheet and the backlight source, increasing thickness of a display panel, and is limited by the poor transformation efficiency of the polarization light from the non-polarization light by the quantum rods.

SUMMARY

Embodiments of the present invention provide a liquid crystal display panel and a method of manufacturing the same, and a display device, for solving at least a part of the problems in prior art.

Embodiments of the present invention provide a liquid crystal display panel, including: an array substrate and an opposite substrate, which are arranged to be opposite to each other, a polarized light source structure disposed on a side of the array substrate and capable of emitting a linearly polarized light; and a polarization sheet disposed on the opposite substrate; wherein the polarized light source structure comprises a first electrode layer, a second electrode layer and a quantum rod contained layer between the first electrode layer and the second electrode layer; the quantum rod contained layer is configured to emit the linearly polarized light when a voltage is applied across the first electrode layer and the second electrode layer; and, a polarization direction of the linearly polarized light is parallel to an absorption axis of the polarization sheet.

Optionally, the linearly polarized light is a monochromatic light or whiter light.

Optionally, the display panel further comprises:
a reflecting layer disposed on a side of the polarized light source structure away from the opposite substrate and configured to reflect the linearly polarized light, emitted by the polarized light source structure, towards the opposite substrate.

Optionally, the quantum rod contained layer is a solid film that is formed in a whole layer, comprising a plurality of quantum rods that can emit the polarized light and have their directivity; and an arrangement direction of longitudinal axes of the quantum rods is parallel to the absorption axis of the polarization sheet.

Optionally, the quantum rod contained layer comprises a solution containing quantum rods; and the polarized light source structure further comprises:
a first orientation layer located between the first electrode layer and the quantum rod contained layer;
a second orientation layer located between the second electrode layer and the quantum rod contained layer; and
a frame sealant disposed at non-display regions of the first orientation layer and the second orientation layer,
wherein the first orientation layer and the second orientation layer are configured to enable longitudinal axes of the quantum rods to be arranged in accordance with orientations of the first orientation layer and the second orientation layer after the first orientation layer and the second orientation layer are electrically energized.

Optionally, the solution comprises an organic solvent, a resin, a coupling agent and an additive agent.

Optionally, the quantum rods are made of any one of the following materials or a combination thereof:
CdSe, CdS, ZnS, ZnSe, CaS and CaSe.

An embodiment of the present invention provides a display device including the liquid crystal display panel provided by the embodiments of the present invention.

An embodiment of the present invention provides a method of manufacturing the liquid crystal display panel provided by the embodiments of the present invention. The method includes:
prior to or posterior to assembling of the array substrate and the opposite substrate, forming a polarized light source structure on the array substrate, which can emit the linearly polarized light.

Optionally, the step of forming a polarized light source structure on the array substrate includes:
forming a first electrode layer on the array substrate;
transfer-printing the quantum rod contained layer on the first electrode layer, wherein the quantum rod contained layer includes a plurality of quantum rods with longitudinal axes arranged in the same direction;
forming a second electrode layer on the quantum rod contained layer, thereby obtaining, on the array substrate, the polarized light source structure including the first electrode layer, the quantum rod contained layer and the second electrode layer.

Optionally, the step of forming a polarized light source structure on the array substrate includes:

forming a first electrode layer on the array substrate;
coating a first orientation layer on the first electrode layer;
forming a second electrode layer on a carrier;
coating a second orientation layer on the second electrode layer;
dripping and injecting a solution containing quantum rods onto the carrier while coating a frame sealant along a cutting line on the array substrate, or, dripping and injecting the solution containing the quantum rods onto the array substrate while coating a frame sealant along a cutting line on the carrier; and
assembling the array substrate and the carrier as a cell with a side of the array substrate where the first orientation layer is coated and a side of carrier where the second orientation layer is coated facing each other and curing the frame sealant, and finally removing the carrier, thereby forming the polarized light source structure, including the first electrode layer, the quantum rod contained layer and the second electrode layer, on the array substrate.

DETAILED DESCRIPTION OF PREFERRED EMBODIMENTS OF THE INVENTION

A further description of the invention will be made in detail as below with reference to embodiments of the present invention taken in conjunction with the accompanying drawings. The following embodiments are intended to explain the present invention and the present invention should not be construed as being limited to the embodiment set forth herein.

Figure 1:
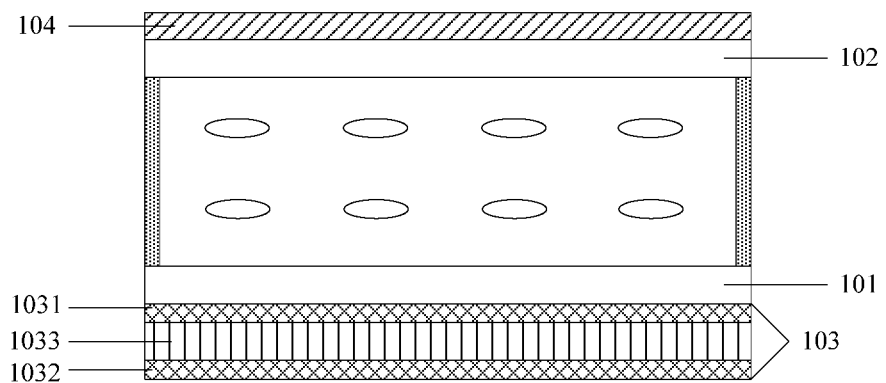
FIG. 1 is a structural schematic view of a liquid crystal display panel according to an embodiment of the present invention.

As shown in FIG. 1, there is illustrated a schematic structural view of a liquid crystal display panel according to an embodiment of the present invention. The liquid crystal display panel includes an array substrate 101 and an opposite substrate 102, which are arranged to be opposite to each other, a polarized light source structure 103 disposed on a side of the array substrate 101 away from the opposite substrate 102 and capable of emitting linearly polarized light, and a polarization sheet 104 disposed on the opposite substrate 102; wherein the polarized light source structure 103 includes a first electrode layer 1031, a second electrode layer 1032 and a quantum rod contained layer 1033 between the first electrode layer and the second electrode layer; the quantum rod contained layer 1033 is configured to emit the linearly polarized light when a voltage is applied across the first electrode layer 1031 and the second electrode layer 1032; and, a polarization direction of the linearly polarized light is parallel to an absorption axis of the polarization sheet 104.

The liquid crystal display panel according to the embodiment further includes, in addition to the array substrate 101 and the opposite substrate 102 which are opposite to each other, the polarized light source structure 103 disposed on the side of the array substrate 101 away from the opposite substrate 102 and capable of emitting linearly polarized light, such that a backlight source may be omitted as the polarized light source structure can emit light. In the embodiment, the polarized light source structure 103 is composed of the first electrode layer 1031, the second electrode layer 1032 and the quantum rod contained layer 1033 located between the first electrode layer 1031 and the second electrode layer 1032 and the polarization direction of the linearly polarized light emitted by the quantum rod contained layer 1033 is parallel to the absorption axis of the polarization sheet 104. As wavelength spectrum of the linearly polarized light emitted by the quantum rods after they are electrically excited covers the wavelength range of the visible light, the polarized light source structure may be used to replace a polarization sheet and a backlight source, reducing a thickness of the display panel, and meanwhile, the linearly polarized light emitted by the polarized light source structure may directly enter the electrode layer, the liquid crystal layer, etc., thereby improving utilization rate of the light.

In practice, the polarized light source structure 103 according to the present invention may be disposed on an array substrate of a liquid crystal display panel that conventionally needs a polarization sheet, or as desired, may also be disposed on other devices that need polarization light. Further, as the polarized light source structure 103 according to the present invention may be electrically excited to emit polarization light, it may be also used as a polarization light source.

The quantum rod contained layer 1033 provided in the embodiment comprises a plurality of quantum rods (i.e., rod-like nanocrystal). Luminescence of the quantum rod originates from its inner core (which may be, for example, quantum dot) that can be electrically excited to emit light. In addition, the quantum rod has its directivity and may emit polarization light. It is known to adjust the material and size (such as diameter) of the quantum rod to make the quantum rod emit monochromatic light or white light as required. In the present invention, the quantum rod may be adjusted to emit monochromatic light or white light as required. Optionally, the linearly polarized light may monochromatic light or white light. When the linearly polarized light is monochromatic light, the color filter sheet may be omitted for the opposite substrate. When the linearly polarized light is white light, the polarized light source structure 103 may be used as a light source which directly emit polarized white light, replacing a lower polarization sheet and a backlight source.

In order to improve utilization of the light, a reflecting layer may be added at outer side of the polarized light source structure. Optionally, the display panel further includes a reflecting layer arranged at a side of the polarized light source structure facing away from the array substrate. The reflecting layer (which is not shown in the FIG. 1) is disposed at the outmost side (i.e., the lower side of the second electrode layer 1032 in FIG. 1) of the polarized light source structure and may reflect light towards the liquid crystal when the quantum rod contained layer emits light.

In practice, the quantum rod contained layer may have a liquid state configuration or in a solid state configuration, which will be specifically described in detail as below.

In an example, the quantum rod contained layer is has a solid state configuration.

Figure 2:
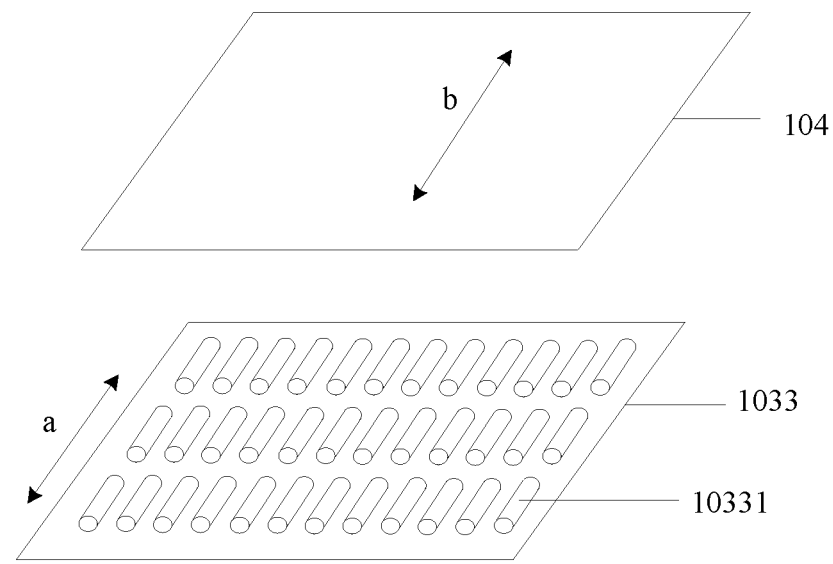
FIG. 2 is a schematic view showing an array orientation of quantum rods and orientation of an absorption axis of a polarization sheet according to an embodiment of the present invention.

FIG. 2 is a schematic view showing an arrangement orientation of the quantum rods and an orientation of an absorption axis of the polarization sheet according to an embodiment of the present invention. Optionally, the quantum rod contained layer is a solid film wholly formed as a layer. An arrangement orientation of major axes of the quantum rods 10331 is parallel to the absorption axis of the polarization sheet 104.

In practice, due to opticity of the liquid crystal, absorption axes of the upper and lower polarization sheets in prior arts are needed to be perpendicular to each other. That is, the polarization direction of the linearly polarized light emitted by the quantum rod contained layer 1033 is parallel to the absorption axis b of the polarization sheet 104 while the polarization direction of the linearly polarized light depends on the arrangement orientation a of the major axes of the quantum rods 10331 in the quantum rod contained layer 1033. As shown in FIG. 2, the arrangement orientation of the major/longitudinal axes of the quantum rods 10331 is parallel to the absorption axis b of the polarization sheet 104. However, it is appreciated that the arrangement of the quantum rods is not limited to FIG. 2. The arrangement orientation of the major/longitudinal axes of the quantum rods 10331 may be modified as required as long as the arrangement orientation is parallel to the absorption axis of the polarization sheet 104.

In another example, the quantum rod contained layer has a liquid state configuration.

Figure 3:
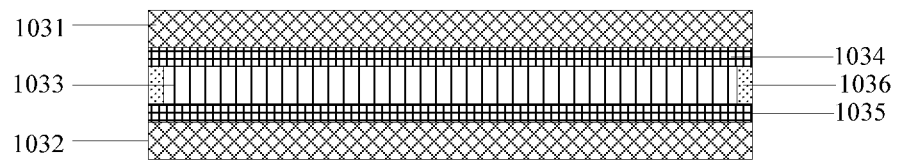
FIG. 3 is a structural schematic view of a polarized light source structure with a liquid state configuration according to an embodiment of the present invention.

FIG. 3 illustrates a structural schematic view of a polarized light source structure with a liquid state configuration.

Optionally, the quantum rod contained layer includes a solution containing quantum rods. The polarized light source structure further includes a first orientation layer 1034 located between the first electrode 1031 and the quantum rod contained layer 1033; a second orientation layer 1035 located between the second electrode 1032 and the quantum rod contained layer 1033; and a frame sealant 1036 disposed at non-display regions of the first orientation layer 1034 and the second orientation layer 1035. In a example, the quantum rod contained layer includes the solution containing quantum rods and the quantum rods in the solution are distributed without a fixed arrangement order. The first orientation layer 1034 and the second orientation layer 1035 are configured to enable the major/longitudinal axes of the quantum rods to be arranged in accordance with directions of the first orientation layer 1034 and the second orientation layer 1035 after the first orientation layer 1034 and the second orientation layer 1035 have been electrically energized. As such, when the first and the second orientation layers are electrically energized, the polarization direction of the linearly polarized light emitted by the quantum rods is associated with the orientations of the first orientation layer 1034 and the second orientation layer 1035, and thus may be set as required.

The above solution containing the quantum rods may include a plurality of matters therein. Optionally, the solution may include quantum rods, organic solvent, resin, coupling agent and additive agent. The organic solvent may have a content in mass percentage of 50%-90%; and may include types such as methyl ethyl ketone, methylisobutylketone, Mono methyl ether glycol ester, gamma-butyrolactone, propionic acid-3-ethyl acetate, butyl carbitol, butyl carbitol acetate, propylene glycol monomethyl ether, propylene glycol monomethyl ether acetate, Diethylene glycol ethyl methyl ether or the like. The resin may be acrylic resin and/or epoxy resin, and a content in mass percentage of the acrylic resin is preferably in a range from 15% to 20% and the type of the acrylic resin may be one of the following: methyl acrylate, ethyl acrylate, 2-methyl methacrylate, 2-ethyl methacrylate, polyester acrylate, polyurethane acrylate, epoxy acrylate or the like; and a content in mass percentage of the epoxy resin is preferably in a range from 1% to 10% and the type of the acrylic resin may be one of the following: aliphatic-epoxy resin, bisphenol A epoxy resin or the like. The coupling agent may include types such as vinyl-silane, amino-silane, epoxy-silane, mercapto-silane or Methacryloyloxy silane, or the like, and may have a content in mass percentage, preferably, in a range from 1% to 10%.

Optionally, the quantum rods contained in the solution may be made of any one of the following materials or a combination thereof: CdSe, CdS, ZnS, ZnSe, CaS and CaSe. A mass percentage of the quantum rods is in a range from 1% to 10%, preferably in a range from 1% to 5%.

In practice, the quantum rods may be dispersed in advance as they tend to aggregate together. For example, the quantum rods may be mixed with a dispersant (for example, BYK161), and a solvent (for example, PMA, propylene glycol methyl ether acetate) with mixture proportions in weight for the quantum rods, BYK161 and PMA being 5~15%, 1% and 84~94% respectively, and they are mixed by agitating them at a linear velocity of 5 m/s~15 m/s, such that they are dispersed and mixed uniformly to be used.

In another embodiment of the display panel of the present invention, different from the above embodiment as shown in FIG. 1, a polarized light source structure is provided on an upper side of the array substrate 101, instead of the side of the array substrate away from the opposite substrate. In this embodiment, other layers may be arranged on the polarized light source structure and the polarized light source structure is similar to that in the above embodiment.

In the embodiment, the display panel may further include a reflecting layer on a side of the polarized light source structure away from the opposite substrate. The reflecting layer may reflect the light emitted from the polarized light source structure towards the opposite substrate.

Based on the same inventive concept, an embodiment of the present invention provides a display device including the liquid crystal display panel according to the above embodiments. As the problem to be solved by and the operation principle of the display device are similar to the liquid crystal display panel according to the above embodiments, embodiments of the display device may be referred to the above liquid crystal display panel and are not described for brief.

Based on the same inventive concept, an embodiment of the present invention provides a method of manufacturing the liquid crystal display panel according to above embodiments of the present invention, including:

prior to or posterior to assembling of the array substrate and the opposite substrate, forming a polarized light source structure on the array substrate, which can emit the linearly polarized light.

In practice, the polarized light source structure may be formed on the array substrate prior to or posterior to the assembling of the array substrate and the opposite substrate. Meanwhile, in order to obtain sufficient brightness, it is necessary to form the polarized light source structure in a whole layer. As for the assembling of the array substrate and the opposite substrate, it can be referred to prior arts for detailed process thereof, which is not described herein. Herein detailed description is made on formation of the polarized light source structure on the array substrate.

As an example, a transfer printing manner may be applied.

Formation of the polarized light source structure in a transfer printing manner is mainly adapted to a quantum rod contained layer with a solid state structure. Optionally, the method of manufacturing, on the array substrate, the polarized light source structure that can emit the linearly polarized light includes the steps of: forming a first electrode layer on the array substrate; transfer printing the quantum rod contained layer in a whole layer, which includes a plurality of quantum rods having major/longitudinal axes arranged in the same direction, on the first electrode layer; forming a second electrode layer on the quantum rod contained layer, thereby forming, on the array substrate, the polarized light source structure including the first electrode layer, the quantum rod contained layer and the second electrode layer.

In practice, for formation of the quantum rod contained layer with a solid state structure, the major/longitudinal axes of the quantum rods in the quantum rod contained layer are arrayed in the same direction. As for the arrangement orientation, it is determined by the orientation/direction of the absorption axis of the polarization sheet on the opposite substrate, which has been described with respect to the liquid crystal display panel and is not repeated here.

As for formation of the polarized light source structure in a whole layer, the first electrode layer is firstly formed on the array substrate, and then a quantum rod contained layer that has been prepared is transfer printed on the first electrode layer; finally, the second electrode layer is formed on the quantum rod contained layer, thereby obtaining a full layer of the polarized light source structure including the first electrode layer, the quantum rod contained layer and the second electrode layer on the array substrate. In this instance, in order to enable the quantum rods to emit light in a better manner when electrically energized, it is necessary that the quantum rod contained layer is in sufficient contact with the electrode layers. Preferably, the first electrode layer and the second electrode layer each are configured in a whole layer.

The embodiments of the present invention are not limited to the formation of the quantum rod contained layer in a solid state. Optionally, the quantum rod contained layer may be formed by injecting a solution containing quantum rods into a reaction chamber, by controlling uniformity and regularity of arrangement orientation of the major/longitudinal axes of the quantum rods by controlling temperature in the reaction chamber. The above mentioned reaction chamber may be formed by means of a Micro Electro Mechanical Systems (MEMS) process.

As another example, a dripping and injecting and assembling manner may be applied.

The polarized light source structure may be manufactured in a dripping and injecting and assembling manner, which is mainly adapted to the quantum rod contained layer having a liquid state structure. Optionally, the method of forming, on the array substrate, the polarized light source structure that can emit the linearly polarized light includes: forming a first electrode layer on the array substrate; coating a first orientation layer on the first electrode layer; forming a second electrode layer on a carrier; forming a second orientation layer on the second electrode layer; coating a second orientation layer on the second electrode layer; injecting a solution containing quantum rods onto the carrier when coating a frame sealant along a cutting line on the array substrate, or injecting the solution containing quantum rods onto the array substrate when coating a frame sealant along a cutting line on the carrier; assembling the array substrate and the carrier as a cell with the side of the substrate where the first orientation layer is coated and the side of carrier where the second orientation layer is coated facing each other and being cured; and finally removing the carrier, thereby forming the polarized light source structure, including the first electrode layer, the quantum rod contained layer and the second electrode layer, on the array substrate.

In practice, the process of manufacturing the polarized light source structure is similar to a process of liquid crystal drip injection and assembling of an array substrate and an opposite substrate, that is, a first electrode layer and a second electrode layer are firstly formed respectively on two carriers, i.e., the first electrode layer is formed on the array substrate and the second electrode layer is formed on a selected carrier, and then orientation layers are respectively coated on the first electrode layer and the second electrode layer. It is noted the coating process of the orientation layers may refer to the prior arts. After coating the orientation layers, the method further includes performing the drip injection of the solution containing quantum rods onto one of the first and the second electrode layers while coating the frame sealant along the cutting line on the other of the first and the second electrode layers. Alternatively, after coating the orientation layers, the method further includes not only coating the frame sealant but also performing the drip injection of the solution containing quantum rods onto the same electrode layer. After the drip injection, the method further includes assembling the array substrate and the carrier as a cell with the side of the substrate where the first orientation layer is coated and the side of carrier where the second orientation layer is coated facing each other and being cured, and finally the carriers are removed, thereby forming the polarized light source structure in a whole layer.

In summary, in the embodiments of the present invention, the polarized light source structure that can emit the linearly polarized light is used to replace a polarization sheet in a conventional liquid crystal display panel. Further, as the polarized light source structure itself can emit light, a backlight source may be omitted. In addition, as the linearly polarized light emitted by the polarized light source structure directly enters the electrode layer and the liquid crystal layer, the utilization of the light may be improved. That is, as the polarized light source structure provided on the array substrate according to the embodiments of the present invention can emit the linearly polarized light, the backlight source and a lower polarization sheet can be omitted, reducing a thickness of the display panel; meanwhile, as the linearly polarized light emitted by the polarized light source structure directly enters the electrode layer and the liquid crystal layer, the utilization of the light may be improved.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

The invention claimed is:
1. A liquid crystal display panel, comprising:
an array substrate and an opposite substrate, which are arranged to be opposite to each other,
a polarized light source structure disposed on a side of the array substrate and capable of emitting a linearly polarized light; and
a polarization sheet disposed on the opposite substrate;

wherein the polarized light source structure comprises a first electrode layer, a second electrode layer and a quantum rod contained layer between the first electrode layer and the second electrode layer; the quantum rod contained layer is configured to emit the linearly polarized light when a voltage is applied across the first electrode layer and the second electrode layer; and, a polarization direction of the linearly polarized light is parallel to an absorption axis of the polarization sheet.

2. The liquid crystal display panel as claimed in claim 1, wherein the linearly polarized light is monochromatic light or white light.

3. The liquid crystal display panel as claimed in claim 1, further comprising: a reflecting layer disposed on a side of the polarized light source structure away from the opposite substrate and configured to reflect the linearly polarized light, emitted by the polarized light source structure, towards the opposite substrate.

4. The liquid crystal display panel as claimed in claim 1, wherein the quantum rod contained layer is a solid film that is formed in a whole layer, comprising a plurality of quantum rods that can emit the polarized light and have their directivity; and an arrangement direction of longitudinal axes of the quantum rods is parallel to the absorption axis of the polarization sheet.

5. The liquid crystal display panel as claimed in claim 1, wherein the quantum rod contained layer comprises a solution containing quantum rods; and the polarized light source structure further comprises:
   a first orientation layer located between the first electrode layer and the quantum rod contained layer;
   a second orientation layer located between the second electrode layer and the quantum rod contained layer; and
   a frame sealant disposed at non-display regions of the first orientation layer and the second orientation layer,
   wherein the first orientation layer and the second orientation layer are configured to enable longitudinal axes of the quantum rods to be arranged in accordance with orientations of the first orientation layer and the second orientation layer after the first orientation layer and the second orientation layer are electrically energized.

6. The liquid crystal display panel as claimed in claim 5, wherein the solution further comprises an organic solvent, a resin, a coupling agent and an additive agent.

7. The liquid crystal display panel as claimed in claim 6, wherein the quantum rods are made of any one of the following materials or a combination thereof: CdSe, CdS, ZnS, ZnSe, CaS and CaSe.

8. A display device, comprising the liquid crystal display panel as claimed in claim 1.

9. A method of manufacturing the liquid crystal display panel as claimed in claim 1, the method comprising:
   prior to or posterior to assembling of the array substrate and the opposite substrate, forming a polarized light source structure, which can emit the linearly polarized light, on the array substrate.

10. The method as claimed in claim 9, wherein the forming a polarized light source structure comprises:
   forming a first electrode layer on the array substrate;
   transfer-printing the quantum rod contained layer on the first electrode layer, wherein the quantum rod contained layer includes a plurality of quantum rods with longitudinal axes arranged in the same direction;
   forming a second electrode layer on the quantum rod contained layer, thereby obtaining, on the array substrate, the polarized light source structure including the first electrode layer, the quantum rod contained layer and the second electrode layer.

11. The method as claimed in claim 9, wherein the forming a polarized light source structure comprises:
   forming a first electrode layer on the array substrate;
   coating a first orientation layer on the first electrode layer;
   forming a second electrode layer on a carrier;
   coating a second orientation layer on the second electrode layer;
   dripping and injecting a solution containing quantum rods onto the carrier while coating a frame sealant along a cutting line on the array substrate, or, dripping and injecting the solution containing the quantum rods onto the array substrate while coating a frame sealant along a cutting line on the carrier; and
   assembling the array substrate and the carrier as a cell with a side of the array substrate where the first orientation layer is coated and a side of carrier where the second orientation layer is coated facing each other and curing the frame sealant, and finally removing the carrier, thereby forming the polarized light source structure, including the first electrode layer, the quantum rod contained layer and the second electrode layer, on the array substrate.

* * * * *